United States Patent
Hölzle et al.

(10) Patent No.: US 6,865,734 B2
(45) Date of Patent: *Mar. 8, 2005

(54) METHOD AND APPARATUS FOR PERFORMING BYTE-CODE OPTIMIZATION DURING PAUSES

(75) Inventors: Urs Hölzle, Goleta, CA (US); Lars Bak, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 707 days.

This patent is subject to a terminal disclaimer.

(21) Appl. No.: 09/836,916

(22) Filed: Apr. 17, 2001

(65) Prior Publication Data

US 2001/0052117 A1 Dec. 13, 2001

Related U.S. Application Data

(63) Continuation of application No. 09/353,124, filed on Jul. 14, 1999, and a continuation of application No. 08/944,735, filed on Oct. 6, 1997, now Pat. No. 5,970,249.

(51) Int. Cl.[7] .................................................. G06F 9/45
(52) U.S. Cl. ................ 717/153; 717/151; 717/140; 717/148; 717/139; 718/102
(58) Field of Search ................ 717/139–140, 717/147–148, 151, 153, 136, 145, 111, 118; 712/216; 718/102; 719/315; 713/323

(56) References Cited

U.S. PATENT DOCUMENTS

| | | | | |
|---|---|---|---|---|
| 4,658,351 A | * | 4/1987 | Teng ........................... 364/200 |
| 4,918,595 A | * | 4/1990 | Kahn et al. .................. 718/102 |
| 5,247,674 A | * | 9/1993 | Kogure ........................ 711/170 |
| 5,394,537 A | * | 2/1995 | Courts et al. ................ 711/202 |
| 5,551,039 A | * | 8/1996 | Weinberg et al. ............ 717/150 |
| 5,586,328 A | * | 12/1996 | Caron et al. ................ 717/146 |
| 5,694,603 A | * | 12/1997 | Reiffin ......................... 395/677 |
| 5,860,004 A | * | 1/1999 | Fowlow et al. .............. 717/109 |
| 5,892,959 A | * | 4/1999 | Fung ........................... 713/323 |
| 5,901,308 A | * | 5/1999 | Cohn et al. .................. 712/244 |
| 5,933,635 A | | 8/1999 | Holzle et al. |
| 5,995,754 A | | 11/1999 | Holzle et al. |
| 5,995,997 A | * | 11/1999 | Horvitz ....................... 709/102 |
| 6,009,517 A | | 12/1999 | Bak et al. |
| 6,141,792 A | * | 10/2000 | Acker et al. ................. 717/116 |
| 6,195,746 B1 | * | 2/2001 | Nair ............................ 712/217 |
| 6,499,123 B1 | * | 12/2002 | McFarland et al. .......... 714/724 |
| 6,640,255 B1 | * | 10/2003 | Snyder et al. ............... 719/315 |

OTHER PUBLICATIONS

Title: Dynamic Partitioning in a Transputer Environment, author: Carlson et al, ACM, 1990.*

(List continued on next page.)

*Primary Examiner*—Chameli C. Das
(74) *Attorney, Agent, or Firm*—Beyer Weaver & Thomas, LLP

(57) ABSTRACT

Methods and apparatus for dynamically compiling byte codes associated with methods during idle periods in the execution of a computer program are disclosed. The described methods are particularly suitable for use in computer systems that are arranged to execute both interpreted and compiled byte codes. In some embodiments, methods to be dynamically compiled are referenced in one or more lists. The lists may be prioritized to facilitate the compilation of the highest priority methods first. In one embodiment, a pair of compilation lists are provided with a first one of the compilation lists being created prior to processing the computer program while the other is created during the processing of the computer program.

20 Claims, 6 Drawing Sheets

OTHER PUBLICATIONS

Title: Portable Run–Time Support for Dynamic Object–Oriented Parallel Processing, author: Grimshaw et al, May 1996.*

Ramji et al., Distributed and Optimistic Make: Implementation and Performance, Apr. 1, 1992, Proceedings of the Annual International Phoenix Conference On Computers And Communications.

Michael Franz, Run–Time Code Generation As A Central System Service, May 5, 1997, IEEE.

Holzle et al., Optimizing Dynamically–Typed Object–Oriented Languages With Polymorphic Inline Caches, 1991, European Conference on Object–Oriented Programming.

Holzle et al., Reconciling Responsiveness With Performance in Pure Object–Oriented Languages, Jul. 4, 1996, ACM Transactions On Programming Languages and Systems, vol., 18, No. 4.

Patent Examiner C. Das, Office Action mailed Dec. 15, 1998 re Serial No. 08/944,735 (U.S. Appl. No. 5,970,249, issued Oct. 19, 1999).

Patent Examiner C. Das, Office Action mailed Aug. 7, 2000 re Serial No. 09/353,124 (U.S. Appl. No. 6,240,548, issued May 29, 2001).

* cited by examiner

METHOD AND APPARATUS FOR PERFORMING BYTE-CODE OPTIMIZATION DURING PAUSES

CROSS REFERENCE TO RELATED APPLICATIONS

This application is a Continuation of U.S. patent application Ser. No. 09/353,124 filed on Jul. 14, 1999, which in turn is a Continuation of 08/944,735 filed Oct. 6, 1997, now U.S. Pat. No. 5,970,249, each of which are incorporated herein by reference.

This application is related to U.S. patent application Ser. No. 08/944,332, entitled "Inline Database for Receiver Types in Object-Oriented Systems," U.S. Pat. No. 6,009,517, entitled "Mixed Execution Stack and Exception Handling," U.S. Pat. No. 08/944,326, entitled "Method and Apparatus for Implementing Multiple Return Sites," U.S. patent application Ser. No. 08/944,331, entitled "Site Specific Message Dispatch in Object-Oriented Systems," U.S. Pat. No. 5,995,754, entitled "Method and Apparatus for Dynamically Optimizing Byte-Coded Programs," U.S. Pat. No. 5,933,635, entitled "Method and Apparatus for Dynamically Deoptimizing Compiled Activations," all filed concurrently herewith, U.S. patent application Ser. No. 08/884,856, entitled "Interpreting Functions Utilizing a Hybrid of Virtual and Native Machine Instructions," filed Jun. 30, 1997, and U.S. Pat. No. 6,021,273, entitled "Interpreter Generation and Implementation Utilizing Interpreter States and Register Caching," filed Jun. 30, 1997, which are all incorporated herein by reference for all purposes in their entirety.

BACKGROUND OF THE INVENTION

1. Field of Invention

The present invention relates generally to methods and apparatus for optimizing the execution of software applications. More particularly, the present invention relates to methods and apparatus for performing compilations or other activities during pauses in the overall execution of a computer program to optimize the use of computer system resources.

2. Description of Relevant Art

Computer systems are often linked across a network, e.g., local area networks, intranets and internets, of computer systems such that they may share resources such as software applications. In general, software applications, or computer programs, may be delivered in different formats to different computer systems, due to the fact that each computer system requires software applications to be in a specific format. Alternatively, the computer programs may be delivered to a computer system in a machine-independent form, i.e., as byte codes, in order to enable one form of a computer program to be utilized by many different computer systems.

When computer programs are delivered in a machine-independent form, the programs may be interpreted directly, or the programs may be translated into machine-dependent code, i.e., "machine code." Programs which are interpreted directly occupy less space in a computer system than programs which are translated into machine code. However, programs which are interpreted directly have slower execution speeds than programs which are translated into machine code, in most cases. As such, the determination of whether or not to interpret a computer program directly, in lieu of translating the computer program into machine code, is often based on the relative importance of space in relation to execution speed.

One approach to compilation is to compile methods within a program that is actively executing when they are first called for execution. This approach is frequently referred to as either dynamic or "runtime" compilation. One problem with dynamic compilation is that the compilation overhead associated with the program may become excessive. That is, when a relatively large number of methods must be compiled at about the same time, the overhead associated with the compilation of the program may be at a level that adversely affects the overall execution of the program. In general, an overuse of system resources for compilation may lead to a less efficient, slower execution of the program. In addition, the time consumed by a compiler which is compiling methods during active program execution may introduce user-visible pauses into the execution of the program. By way of example, when a user inputs a command into the program while the compilation overhead of the program is high, there may be a delay in the response to the user input. Such delays in response may be annoying to a user. Therefore, mechanisms that improve the apparent efficiency of dynamic compilation of methods in a computer program would be desirable.

SUMMARY OF THE INVENTION

To achieve the foregoing and other objects of the invention, methods and apparatus for dynamically compiling methods during idle periods in the execution of a computer program are disclosed. The described methods are particularly suitable for use in computer systems that are arranged to execute both interpreted and compiled byte codes. According to one aspect of the present invention, an idle or low overhead period in the processing of a computer program is identified. One or more methods that have been identified for compilation are then dynamically compiled during the identified idle period. In some embodiments, methods to be dynamically compiled are referenced in one or more lists. The lists may be prioritized to facilitate the compilation of the highest priority methods first. In one embodiment, a pair of compilation lists are provided with a first one of the compilation lists being a database list created prior to processing the computer program while the other being an execution list created during the processing of the computer program.

In one embodiment, if an interrupt is received during the compilation of a method, the compilation is allowed to continue for a predetermined period of time. If the compilation is not completed during the predetermined period of time, then the compilation is aborted.

In some embodiments, a determination is made regarding whether a method identified for compilation has previously been compiled after a period of low activity has been identified. When it is determined that the method has not been previously compiled, the compilation is initialized. If the first method has already been compiled, a second method is selected during the period of low activity, and the compilation of the second method is initiated if the second method has not been previously compiled.

In other embodiments, a priority value is determined for each of a plurality of methods associated with the computer program. The highest priority methods are then executed first. In one such embodiment, the priority value for each method is determined by processing an invocation counter associated for each method during the period of low activity.

According to still another aspect of the present invention, a computer system for dynamically compiling byte-coded methods during a period of low activity in the processing of a computer program includes a mechanism for identifying a period of low activity. The system further includes a mechanism for identifying a method for compilation during the period of low activity. A compiler is arranged to initialize a compilation of the identified method during the period of low activity. In one embodiment, the system also includes an interrupt processor which is arranged to handle interrupt signals received during the compilation of the identified method, and an aborting mechanism which aborts the compilation of the method when necessary.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

As described above, the dynamic compilation of methods associated with a byte-coded program while the program is actively executing may cause the program to execute inefficiently. This inefficiency may be a result of an excessive use of available computer system resources by the compiler, or compilation overhead. The time consumed by a compiler that is dynamically compiling methods during active program execution may introduce delays into the execution of the program. When such delays are perceptible to a user, the delays may be considered to be unacceptable, especially when the length of a delay is relatively long, e.g., more than approximately 200 milliseconds.

One approach to improving the performance of such programs is to permit the mixing of both interpreted and dynamically compiled byte codes. By way of example, an improved computer system that is arranged to execute both interpreted byte codes and dynamically compiled byte codes is described in commonly assigned, co-pending U.S. patent application Ser. No.: 08/884,856, filed Jun. 30, 1997, which is incorporated herein by reference. Within such a system, decisions must still be made as to when it is efficient to compile a particular method. In the present invention, method and an apparatus are described for delaying the dynamic compilation of methods in a computer program when compilation overhead is relatively high. More specifically, when it is determined that compilation overhead is too high, the dynamic compilation of at least some of the methods may be delayed until there are periods of relatively lower activity in the overall processing of the program.

By delaying the dynamic compilation of at least some byte-coded methods which are slated for compilation, computer resources may be more efficiently utilized. While a computer program is essentially inactive during processing, e.g., when the computer program is idle while awaiting input from a user, the overall resource utilization overhead associated with the execution of the program is generally relatively low. During such periods of low activity, available system resources may be used to perform compilations of methods which have previously been identified as being methods which are to be compiled. Performing compilations while the computation overhead of the computer program is low allows for the efficient usage of overall system resources and, typically, does not cause delays which are noticeable to a user.

Figure 1:
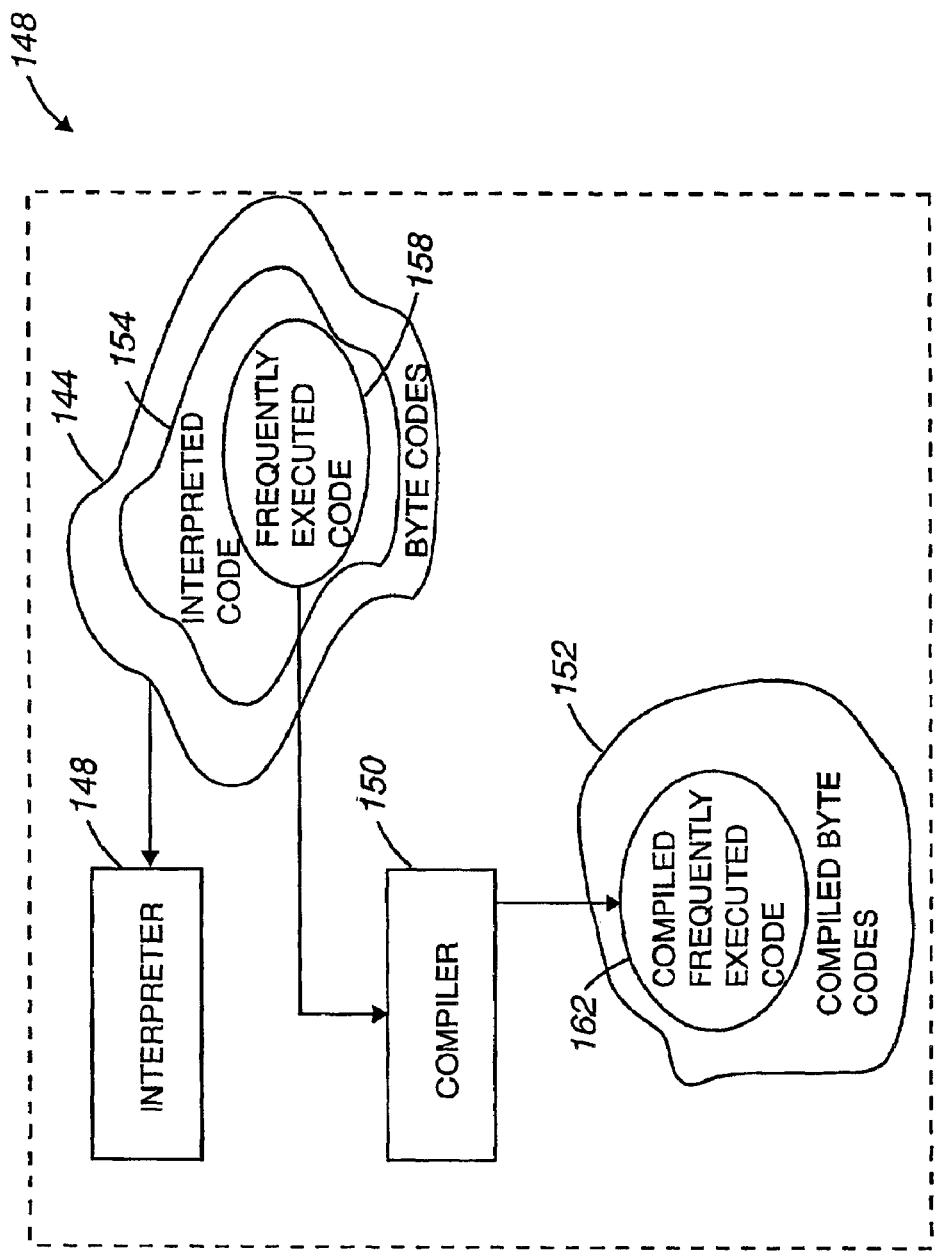
FIG. 1 is a block diagram representation of a computer system which dynamically compiles code in accordance with an embodiment of the present invention.

With initial reference to FIG. 1, a computer system which allows byte codes to be dynamically compiled will be described in accordance with an embodiment of the present invention. Byte codes 144 are provided as input to a computer system 146 at run-time. Byte codes 144, which may generally be organized as a computer program, are typically arranged in parseable segments such as methods, or routines. In one embodiment, byte codes 144 may be provided by a compile-time environment within a virtual machine to a run-time environment, e.g., computer system 146, within the same virtual machine. One suitable virtual machine on which the present invention may be implemented will be discussed below in more detail with respect to FIG. 6.

When byte codes 144 are provided to computer system 146, byte codes 144 may be processed with an interpreter 148. Alternatively, byte codes 144 may be compiled by a compiler 150 to produce compiled byte codes 152. It should be appreciated that byte codes 144 may generally be inputted to both interpreter 148 and compiler 150 for processing, substantially simultaneously.

Each time a method is invoked, if the method is not compiled, byte codes 144 associated with the method are interpreted using interpreter 148. In one embodiment, a measure of how many times a method is interpreted is maintained. Such measures may include a counter, e.g., an invocation counter, which is included in each interpreted method, and is incremented each time the method is interpreted, as described in U.S. Pat. No. : 5,995,754, which is incorporated herein by reference in its entirety.

When the number of times a method is interpreted exceeds a threshold, i.e., a limiting value, the method may be compiled using compiler 150. Repeatedly interpreting a method, which is included in frequently executed code 158, may be inefficient, as interpreted byte code 154 generally executes slower, or less efficiently, than compiled code. Compiling frequently executed code 158 generally may allow methods embodied in frequently executed code 158 to be executed more efficiently, as time-savings gained by compiling the method is likely to compensate for the compilation overhead associated with the compilation process.

During run-time, the compilation overhead associated with compiling byte codes 144 using compiler 150 is monitored to ensure that the compilation overhead does not exceed a typically predetermined maximum acceptable level. The compilation overhead is often expressed in terms of the percentage of processor time required for compilation as opposed to execution. The predetermined maximum overhead level may be widely varied depending on the needs and characteristics of a particular system. By way of example, for a virtual machine intended to provide high execution performance, the predetermined maximum level may be within the range of approximately 10 percent to approximately 30 percent usage of the overall system resources. When the overhead associated with the compilation of byte codes 144 exceeds the predetermined maximum level, then methods which would be compiled if the compilation overhead were lower may be placed in an execution list, or queue. This execution list is essentially a waiting list of methods which may be processed when the compilation overhead is lower, i.e., methods in the execution list may be compiled when the compilation overhead is lower. Specifically, the execution list may be processed at times when both the compilation overhead, as well as the overall computation overhead associated with computer system 146, are at a low level.

Figure 2:
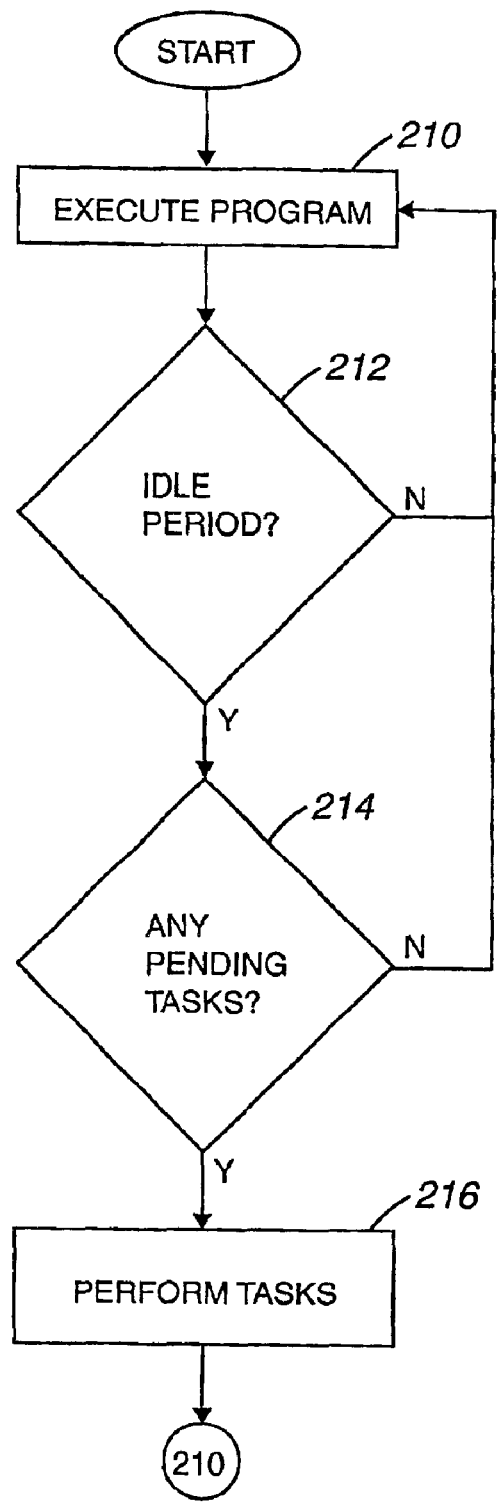
FIG. 2 is a process flow diagram which illustrates the steps associated with executing a program which includes the capability of compiling code during pauses in accordance with an embodiment of the present invention.

When byte codes are to be compiled during otherwise idle periods in the overall execution of a program, e.g., during idle periods which occur throughout the processing of byte codes, the program may be monitored to determine when pauses occur. Referring next to FIG. 2, a process of executing a program, or an application, which includes the capability of compiling code during pauses will be described in accordance with an embodiment of the present invention. The execution of a program begins at step 210, and in step 212, a determination is made regarding whether the execution of the program has reached an idle period.

An idle period is generally a pause, e.g., a think pause, in the processing of the program during which the program is essentially inactive. The program may be awaiting an action such as a timer signal from the associated operating system, or the program may be awaiting a user input, prior to actively continuing execution. In general, a think pause occurs while the program is awaiting an action from a user. It should be appreciated that the length of an idle period may vary widely. By way of example, the length of an idle period may vary from very few milliseconds to approximately half a second. When an idle period occurs because a program is awaiting input from a user, the idle period may generally be much longer, as for example on the order of a number of seconds, minutes, days or more.

In general, a threshold value is used to recognize a "useful" pause. For example, if the actual pause has lasted for a predetermined number of milliseconds, then the system may recognize the pause as a useful pause which is likely to continue for a whole longer. When the pause is likely to continue, then compilations may be allowed to continue in order to exploit the pause. As such, the determination in step 212 regarding whether the execution of the program has reached an idle period involves determining whether a period of low activity has reached a threshold value, e.g., approximately 100 milliseconds or approximately half a second.

In general, the occurrence of an idle period, or period of relatively low activity, may be identified by monitoring the usage of the central processing unit (CPU) associated with the execution of the program. Alternatively, the existence of an idle period may be determined by monitoring the status of threads associated with the overall computer system.

When CPU usage is monitored to identify periods of relative inactivity, CPU usage is essentially monitored to determine when the CPU usage falls below a certain usage threshold. The usage threshold, i.e., a "low activity threshold," may be widely varied. By way of example, the usage threshold may be set such that when substantially only activities with low overhead, such as setting a cursor to periodically blink, are running, the program is considered to be idle. In one embodiment, when CPU usage during the processing of the program falls below a usage threshold which is approximately 20 percent of the overall system resources, then the overall processing of the program is considered to be in a period of low activity. At such times, at least approximately 80 percent of the system resources may be available for use.

Monitoring the status of threads may involve studying a thread scheduler, as will be appreciated by those skilled in the art. When the thread scheduler indicates that all threads are blocked, i.e., substantially none of the threads are in a "run-able" state, then the implication is that the program is not consuming CPU time. CPU time will generally not be consumed until a signal arrives, at which point a thread may become unblocked. When CPU time is not being consumed, then the program is generally in an idle period.

If it is determined in step 212 that the execution of the program is not in an idle period, then process flow returns to step 210 where the program continues to execute. If, instead, it is determined in step 212 that there is an idle period, a determination is made in step 214 regarding whether there are any pending tasks, as for example compilations. That is, a determination is made regarding whether there are any tasks which are slated to occur during idle periods. The tasks may generally include a wide variety of tasks, as for example compilations and garbage collection. Such tasks may be prioritized in terms of their relative importance within a system. In the described embodiment, the tasks will be described in terms of pending compilations.

Pending compilations may generally be obtained from two sources, a database list and an execution list, which are lists of "candidate" methods for compilation. One arrangement for creating a database list may involve a system which monitors compiled methods. An example of such an arrangement for creating a database list when a database is inlined, is described in co-pending U.S. patent application Ser. No.: 08/944,332, which is incorporated herein by reference in its entirety. In such a system, the database list is essentially a "working set," or a "candidate set," of methods which were compiled during a previous execution of the program, and are considered as methods that are likely to be compiled in a subsequent execution of the program. One system which is capable of creating a database list other mechanisms may be used to create or add to a database list as well. It should be appreciated that in some embodiments, the database list may include other tasks such as the performance of garbage collection.

An execution list, as mentioned above, is a queue of methods, or a candidate set of methods, which is created during the current execution of the program. The execution list may contain, or identify, methods which were suppressed from compilation due to the fact that the compilation overhead, as described in U.S. Pat. No.: 5,995,754, was previously considered to be too high to allow the methods to be compiled. The execution list may also identify methods which were periodically added to the list by a separate sweeper process which studies the invocation counters, i.e., counters which track the number of times a method has been interpreted, associated with interpreted methods. In general, the invocation counter for a method is incremented each time the method is invoked. The sweeper may periodically study invocation counters to determine if invocation counters of methods which have not been recently invoked are at a level which is currently considered to deem the method as appropriate for compilation. Since the threshold, e.g., the number of invocations of a method which must generally be reached in order for the method to be considered for compilation, may vary during program execution, methods with invocation counters that are over a current threshold may be added to the execution list by the sweeper. Other mechanisms may be used to create or add to the execution list as well. In some embodiments, the execution list may be associated with a general work list which includes pending compilations in addition to other pending tasks, e.g., garbage collection.

When it is determined through studying the execution list and the database list in step 214 that there are no pending tasks, then process flow returns to step 210 in which the program continues to execute. When, on the other hand, it is determined that there are pending compilations, then in step 216, the tasks, e.g., compilations, are performed. The steps associated with performing the pending compilations will be described below with reference to FIG. 3. After pending compilations are performed, process flow returns to step 210 in which the program continues to execute.

Figure 3:
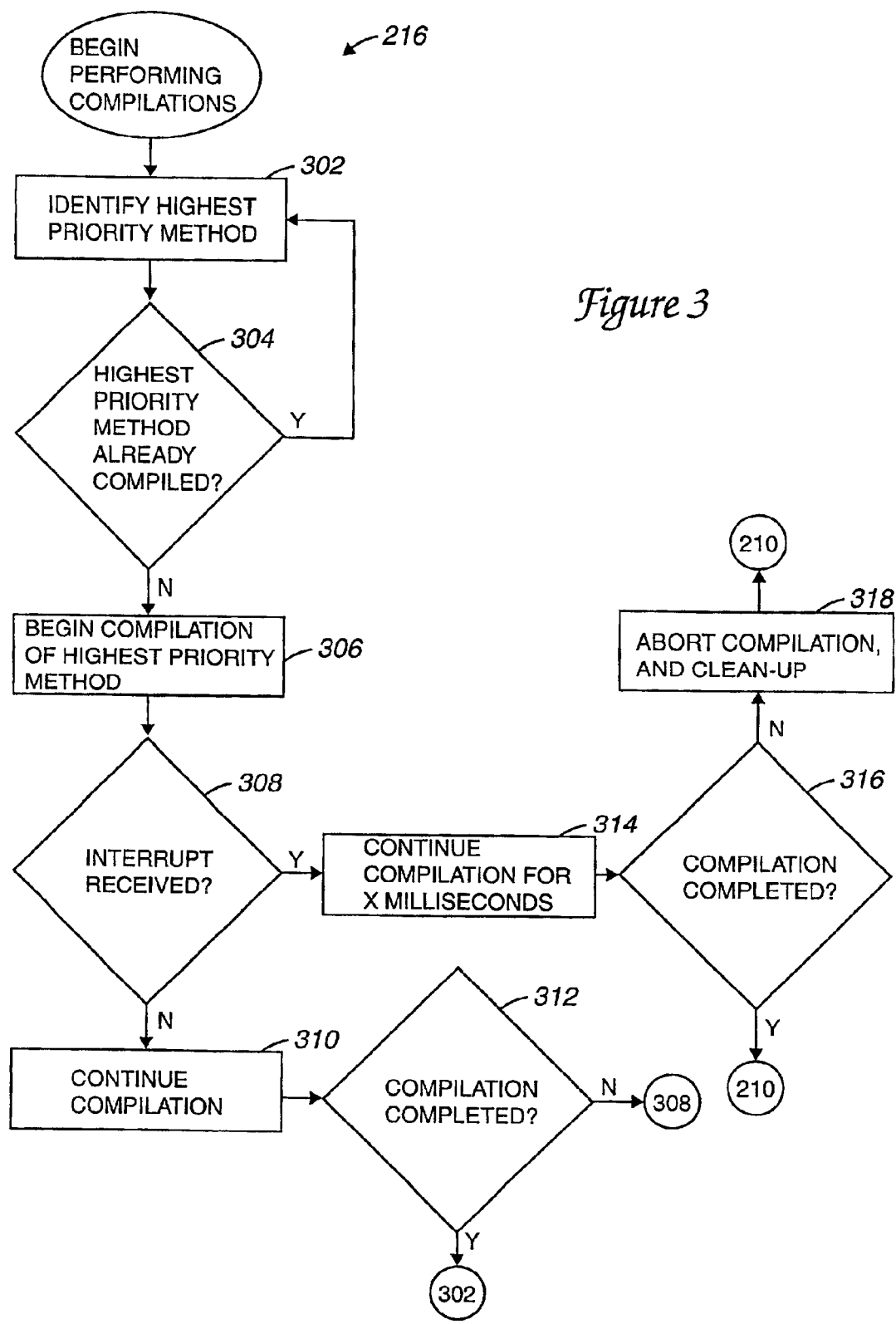
FIG. 3 is a process flow diagram which illustrates the steps associated with performing compilations on methods, i.e., step 216 of FIG. 2, in accordance with an embodiment of the present invention.

As previously mentioned, in the described embodiment, a method is compiled when it is anticipated that compiling the method and invoking the compiled method is likely to be more efficient than interpreting the method. Such compilations may be delayed until there are idle periods during the execution of the overall program, in order to avoid excessive compilation overhead. FIG. 3 is a process flow diagram which illustrates the steps associated with performing delayed compilations on methods, i.e., step 216 of FIG. 2, in accordance with an embodiment of the present invention. The process of performing compilations begins at step 302 where the candidate method with the highest priority is identified. In one embodiment, the highest priority method may be the method with the highest number of invocation counts in, or identified by, the execution list. Alternatively, the highest priority method may be the method with the shortest anticipated compilation time on the execution list. The identification of the highest priority method will be discussed in more detail below with reference to FIG. 4.

After the highest priority method is identified in step 302, a determination is made in step 304 regarding whether the highest priority method has already been compiled. The highest priority method may already be compiled for a variety of different reasons. By way of example, after the method is placed in the execution list, during the course of overall program execution, the method may be invoked and compiled while compilation overhead is low. As such, the method is already compiled, and may not have been removed from the execution list, as repeatedly updating the execution list is expensive. The highest priority method may also be previously compiled if the method is obtained from the database list. That is, when the same method appears in both the execution list and the database list, if the method was already compiled using the execution list, for example, and the database list is not updated due to high costs, then the method may already be compiled when it is identified as the highest priority method in the database list.

When the determination in step 304 is that the highest priority method is already compiled, then the method may be removed from the appropriate list, i.e., either the execution list or the database list, and process flow returns to step 302 where a new highest priority method is identified. If, instead, it is determined that the highest priority method has not been previously compiled, then in step 306, the compilation of the highest priority method begins. That is, the compilation of the highest priority method is initialized.

During the compilation of the highest priority method, interrupts may be received. In general, interrupts may include, but are not limited to, timer signals and user inputs, e.g., keyboard inputs. It is determined in step 308 whether an interrupt has been received. As will be appreciated by those skilled in the art, when an interrupt is received, the compilation of the highest priority method may automatically cease in order for the interrupt to be processed as necessary.

If an interrupt has been received, then the compilation of the highest priority method is allowed to continue for a predetermined period of time in step 314. The predetermined period of time is, in one embodiment, essentially a "time to live" for a compilation after a signal has been received that will set at least one thread in a runable state. By allowing the compilation to continue briefly after an interrupt is received, the compilation is given a chance to be completed, in the event that the compilation is close to completion.

Although the predetermined period of time may be widely varied, the predetermined period of time is generally a number of milliseconds, e.g., "X milliseconds." Shorter periods of time in the range of approximately 10 milliseconds to approximately 200 milliseconds are preferred, since it has been observed that delays of time of greater than approximately 200 milliseconds in response to user input are perceptible and, hence, often annoying to a user. The period of time may be varied based on the source of the signal or the priority of the threads in a run-able state, with shorter periods being used for higher-priority signals or threads.

After the compilation is allowed to continue for the predetermined period of time in step 314, a determination is made in step 316 regarding whether the compilation has been successfully completed during the predetermined period of time. If the compilation has been completed, then process flow moves to step 210 of FIG. 2, where the overall execution of the program continues. It should be appreciated that once the compilation is completed, the newly compiled method will also be removed from either the execution list or the database list, depending upon which list the method was obtained from.

When the compilation is not completed during the predetermined period of time, then process flow moves from step 316 to step 318 in which the compilation is aborted. The compilation is not allowed to be completed due to the fact that allowing the compilation to be completed may result in a significant delay in the execution of the overall program or, more specifically, the processing of the interrupt. When the compilation is aborted, "clean up" occurs, e.g., system resources used in the attempted compilation are relinquished, as will be understood by those skilled in the art. Once the compilation is aborted, process flow moves to step 210 of FIG. 2, in which the overall execution of the program continues.

Returning to step 308, in the event that no interrupt has been received during the compilation of the highest priority method, the compilation continues in step 310. A determination is made in step 312 regarding whether the compilation has been completed. If it is determined that the compilation has been completed, the highest priority method may be removed from the appropriate list, and process flow returns to step 302 in which a new highest priority method is identified. Alternatively, if it is determined in step 312 that the compilation has not been completed, then the compilation is allowed to continue until either it is completed, or it is aborted due to the receipt of an interrupt in step 308.

In general, the "order" in which methods in an execution list and a database list are compiled may be determined based upon a number of different factors. The methods in each list may be assigned priority values relative to other methods in the same list. The priority values may generally be assigned at any time during the overall execution of the program, and may further be updated throughout the course of program execution. By way of example, the priority values in a list may be computed and updated, i.e., re-evaluated, each time a method is added to the list. Priority values may also be re-evaluated at the beginning of each idle period to ensure that the priorities of methods in the execution list and the database list are current at the time methods are chosen for compilation.

The priority value of a method may be calculated based on any combination of factors including, but not limited to, the invocation count of the method, the position of the method within the list, the estimated compilation time of the method, and the length of the current idle period during the overall execution of the program. Alternatively, in one embodiment, the priority value of a method may essentially be assigned randomly.

The method which has the highest invocation count in a list may have the highest compilation priority, as it is essentially the most frequently invoked interpreted method. The position of a method within a list may also affect the priority value assigned to the method, since the method most recently added to the list is often likely to be needed in the immediate future. The method which has the shortest estimated compilation time in a list may have the highest compilation priority, since the compilation of a method with a shorter estimated compilation time is generally more likely to be completed during an idle period than the compilation of a method with a longer estimated compilation time. In general, the compilation time of a method may be estimated by the length of the method, e.g., a relatively short method will typically have a relatively short compilation time.

The length of the current idle period may also affect the priority value of a method. For example, if the current idle period has already been relatively long, then the likelihood that the idle period will last longer is generally increased. Long idle periods may often be a result of a user leaving the computer on which the overall execution of the program is occurring for a prolonged period of time. As such, it has been observed that when it is determined that a current idle period has already been relatively long, the likelihood that the idle period will last even longer is generally reasonably high. Therefore, when an idle period is expected to be relatively long, methods with longer expected compilation times may have higher compilation priorities, since methods with shorter expected compilation times may typically be readily compiled during subsequent shorter idle periods.

As previously mentioned, the priority value of a method may be based on a number of different factors. In other words, a priority function may be used to determine a priority value. The form of such a priority function may generally be widely varied. By way of example, a priority function may divide the invocation count for a method by the estimated compilation time for the method in order to obtain a priority value for the method. Alternatively, a priority function may involve using the invocation count for methods with shorter estimated compilation times and using the invocation count divided by a constant for methods with longer estimated compilation times.

Figure 4:
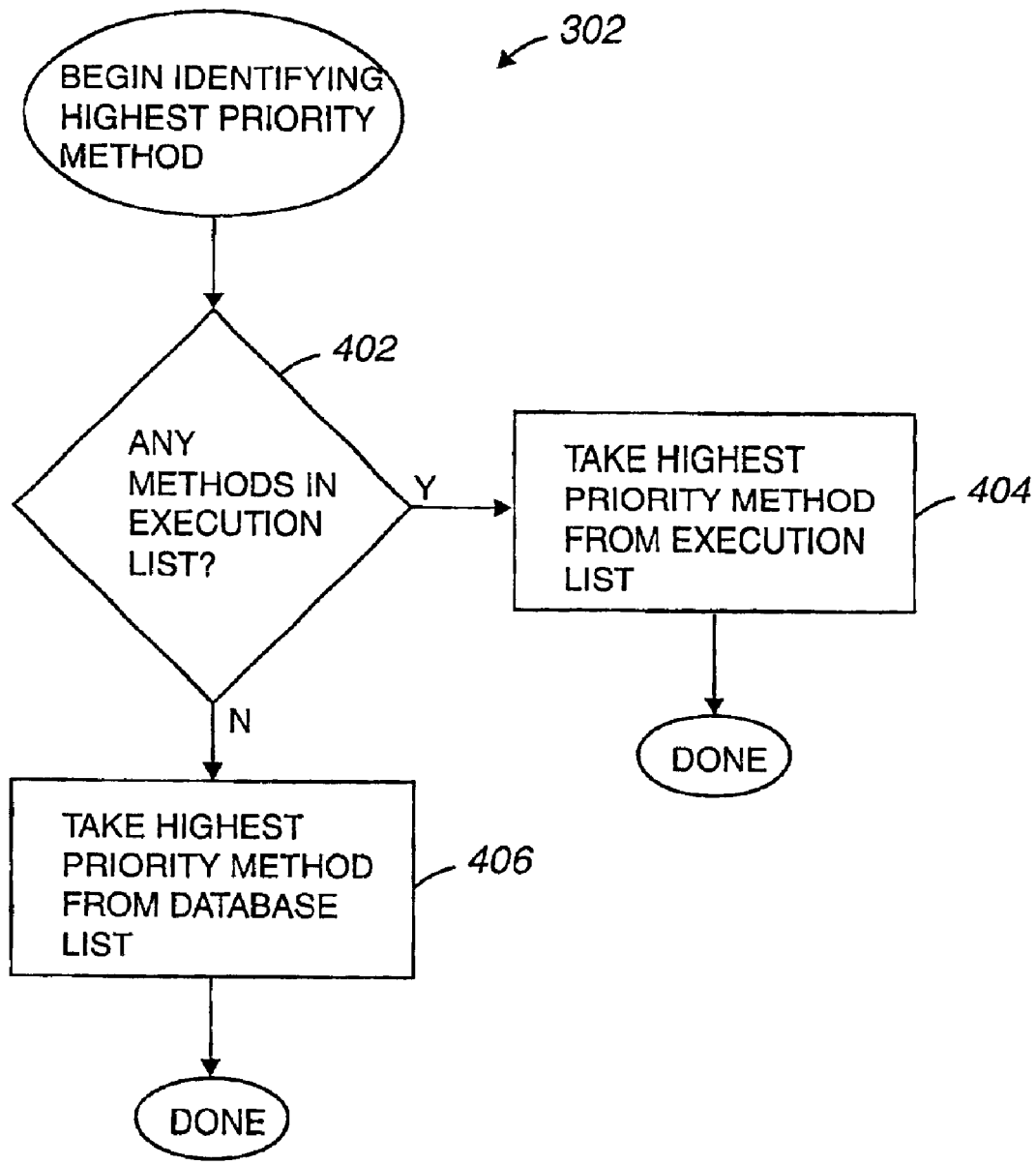
FIG. 4 is a process flow diagram which illustrates the steps associated with identifying the highest priority method, i.e., step 302 of FIG. 3, in accordance with an embodiment of the present invention.

Referring next to FIG. 4, the steps associated with identifying the method with the highest priority value, i.e., step 302 of FIG. 3, will be described in accordance with an embodiment of the present invention. The identification of the method with the highest priority begins at step 402 with a determination of whether any methods are present in the execution list associated with the program.

In general, methods in an execution list are considered as having compilation priorities that are higher than those of methods in a database list. Methods in the execution list are methods that have been identified during the course of program execution as being likely to overcome the associated compilation overhead by executing more efficiently, because the methods are repeatedly invoked. Alternatively, methods in the database list are methods which may potentially be repeatedly invoked and, hence, compiling the methods is likely to be beneficial. In other words, the execution list reflects the current, or actual, usage of methods, while the database list essentially reflects long-term usage of methods. Therefore, methods from the execution list are typically chosen for compilation before methods from the database list, since compiling the methods in the execution list is more likely to lead to a more efficient overall execution of the program which uses the methods.

If the determination in step 402 is that there are methods in the execution list, then in step 404, the method with the highest priority in the execution list is selected for compilation. Once the method is selected from the execution list, then the process of identifying the highest priority method is completed. Alternatively, if the determination in step 402 is that there are no methods in the execution list, then the highest priority method in the database list is selected for compilation. After the method is selected from the database list, then the process of identifying the highest priority method is completed.

Figure 5:
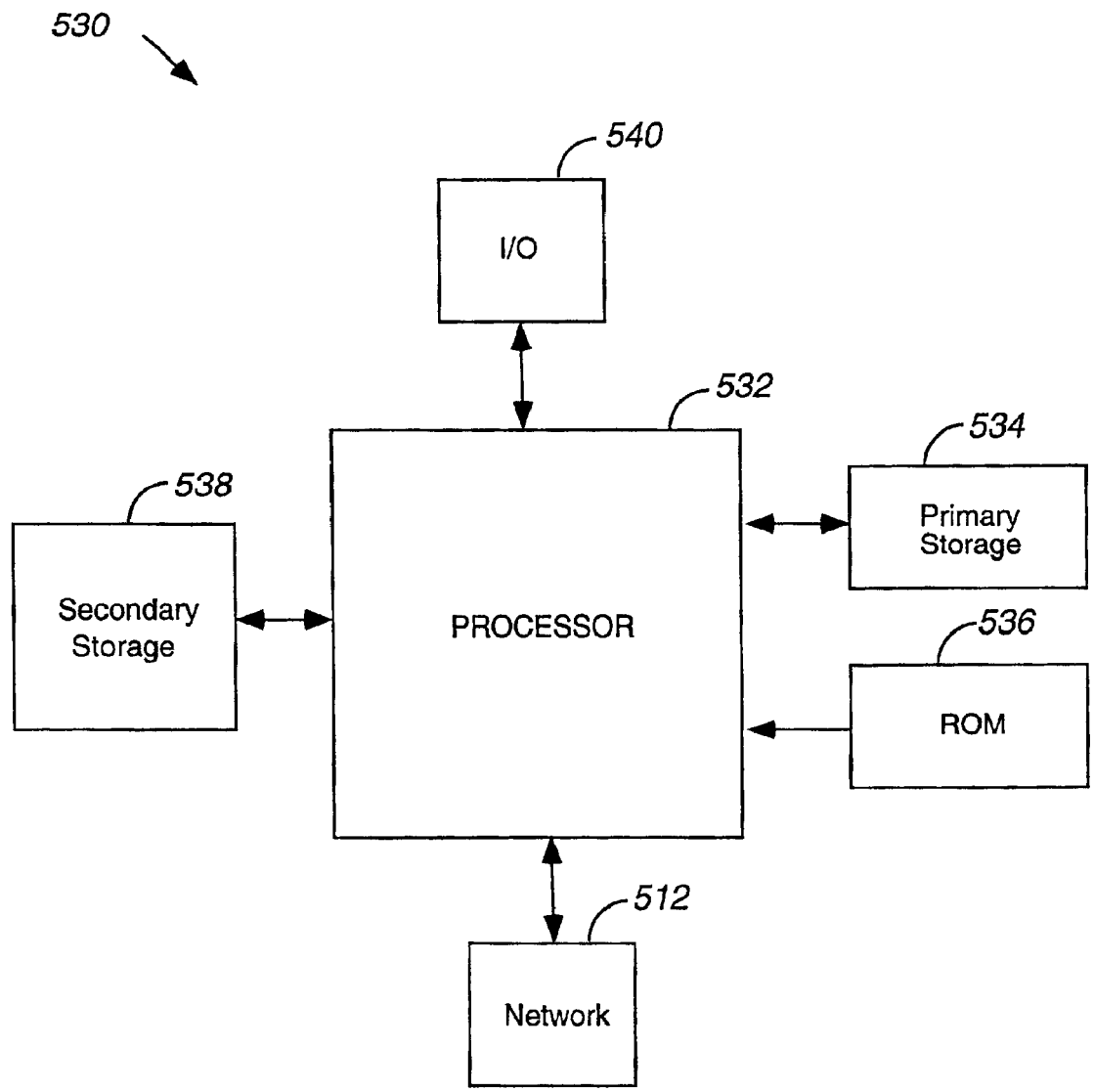
FIG. 5 illustrates a typical, general purpose computer system suitable for implementing the present invention.

The present invention may generally be implemented on any suitable computer system. Specifically, the compilation of queued methods during idle periods in the overall execution of a program may be accomplished using any suitable virtual machine, such as the virtual machine described below with respect to FIG. 6. FIG. 5 illustrates a typical, general purpose computer system suitable for implementing the present invention. The computer system 530 includes any number of processors 532 (also referred to as central processing units, or CPUs) that are coupled to memory devices including primary storage devices 534 (typically a read only memory, or ROM) and primary storage devices 536 (typically a random access memory, or RAM).

Computer system 530 or, more specifically, CPU 532, may be arranged to support a virtual machine, as will be appreciated by those skilled in the art. One example of a virtual machine that is supported on computer system 530 will be described below with reference to FIG. 6. As is well known in the art, ROM acts to transfer data and instructions uni-directionally to the CPU 532, while RAM is used typically to transfer data and instructions in a bi-directional manner. CPU 532 may generally include any number of processors. Both primary storage devices 534, 536 may include any suitable computer-readable media. A secondary storage medium 538, which is typically a mass memory device, is also coupled bi-directionally to CPU 532 and provides additional data storage capacity. The mass memory device 538 is a computer-readable medium that may be used to store programs including computer code, data, and the like. Typically, mass memory device 538 is a storage medium such as a hard disk or a tape which is generally slower than primary storage devices 534, 536. Mass memory storage device 938 may take the form of a magnetic or paper tape reader or some other well-known device. It will be appreciated that the information retained within the mass memory device 538, may, in appropriate cases, be incorporated in standard fashion as part of RAM 536 as virtual memory. A specific primary storage device 534 such as a CD-ROM may also pass data uni-directionally to the CPU 532.

CPU 532 is also coupled to one or more input/output devices 540 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 532 optionally may be coupled to a computer or telecommunications network, e.g., a local area network, an internet network or an intranet network, using a network connection as shown generally at 512. With such a network connection, it is contemplated that the CPU 532 might receive information from the network, or might output information to the network in the course of performing the above-described method steps. Such information, which is often represented as a sequence of instructions to be executed using CPU 532, may be received from and outputted to the network, for example, in the form of a computer data signal embodied in a carrier wave. The above-described devices and materials will be familiar to those of skill in the computer hardware and software arts.

Figure 6:
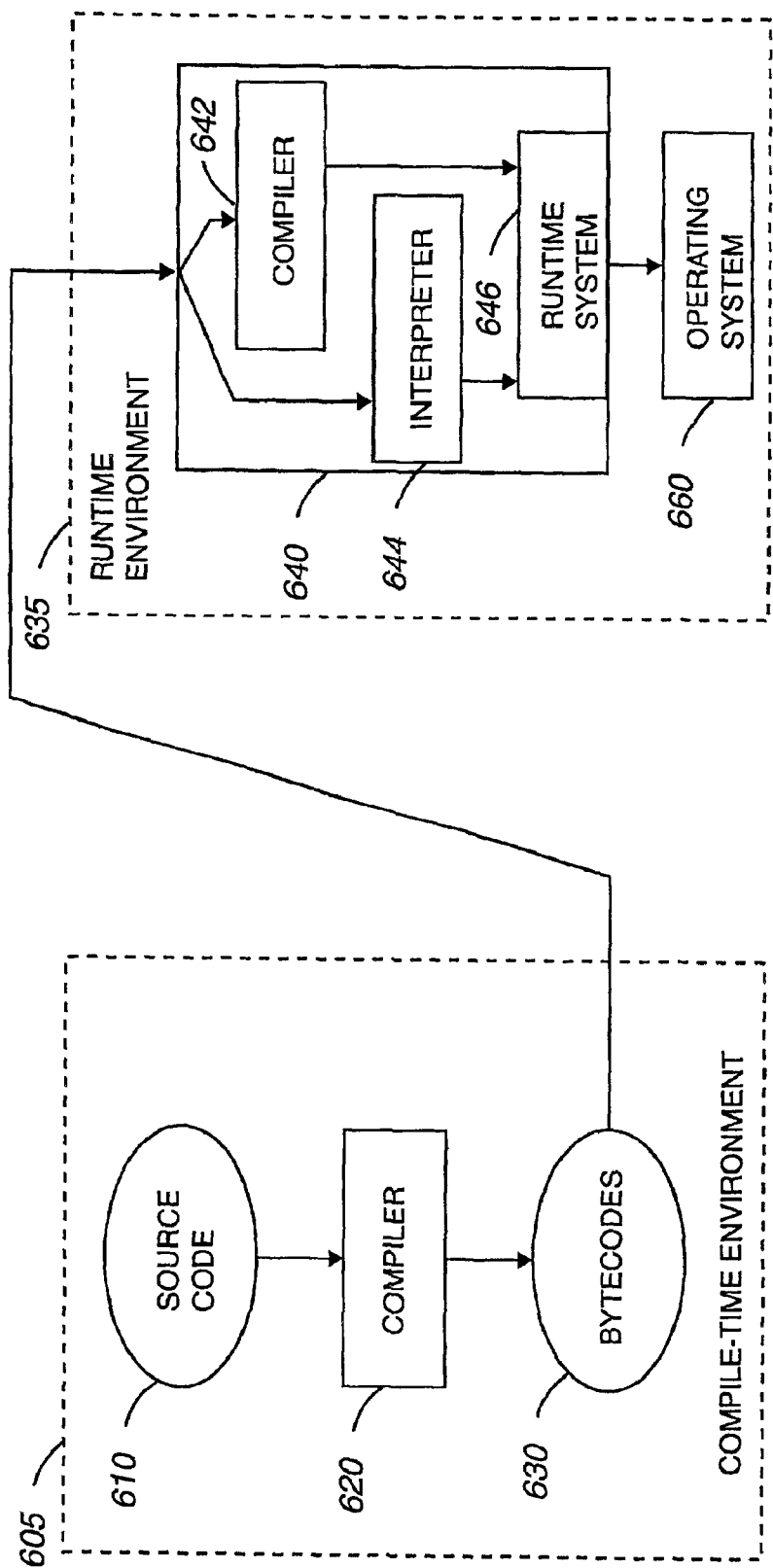
FIG. 6 is a diagrammatic representation of a virtual machine which is suitable for implementing the present invention.

As previously mentioned, a virtual machine may execute on computer system 530. FIG. 6 is a diagrammatic representation of a virtual machine which is supported by computer system 530 of FIG. 5, and is suitable for implementing the present invention. When a computer program, e.g., a computer program written in the Java™ programming language developed by Sun Microsystems of Mountain View, Calif., is executed, source code 610 is provided to a compiler 620 within a compile-time environment 605. Compiler 620 translates source code 610 into byte codes 630. In general, source code 610 is translated into byte codes 630 at the time source code 610 is created by a software developer.

Byte codes 630 may generally be reproduced, downloaded, or otherwise distributed through a network, e.g., network 512 of FIG. 5, or stored on a storage device such as primary storage 534 of FIG. 5. In the described embodiment, byte codes 630 are platform independent. That is, byte codes 630 may be executed on substantially any computer system that is running a suitable virtual machine 640. By way of example, in a Java™ environment, byte codes 630 may be executed on a computer system that is running a Java™ virtual machine.

Byte codes 630 are provided to a runtime environment 635 which includes virtual machine 640. Runtime environment 635 may generally be executed using a processor such as CPU 532 of FIG. 5. Virtual machine 640 includes a compiler 642, an interpreter 644, and a runtime system 646. Byte codes 630 may generally be provided either to compiler 642 or interpreter 644.

When byte codes 630 are provided to compiler 642, methods contained in byte codes 630 are compiled into machine instructions, as described above. On the other hand, when byte codes 630 are provided to interpreter 644, byte codes 630 are read into interpreter 644 one byte code at a time. Interpreter 644 then performs the operation defined by each byte code as each byte code is read into interpreter 644. In general, interpreter 644 processes byte codes 630 and performs operations associated with byte codes 630 substantially continuously.

When a method is called from an operating system 660, if it is determined that the method is to be invoked as an interpreted method, runtime system 646 may obtain the method from interpreter 644. If, on the other hand, it is determined that the method is to be invoked as a compiled method, runtime system 646 activates compiler 642. Compiler 642 then generates machine instructions from byte codes 630, and executes the machine-language instructions. In general, the machine-language instructions are discarded when virtual machine 640 terminates. The operation of virtual machines or, more particularly, Java™ virtual machines, is described in more detail in *The Java™ Virtual Machine Specification* by Tim Lindholm and Frank Yellin (ISBN 0-201-63452-X), which is incorporated herein by reference in its entirety.

Although only a few embodiments of the present invention have been described, it should be understood that the present invention may be embodied in many other specific forms without departing from the spirit or the scope of the invention. By way of example, steps involved with performing a compilation during an idle period may be reordered, removed or added. In general, steps involved with the methods of the present invention may be reordered, removed, or added without departing from the spirit or the scope of the present invention.

A highest priority method for compilation has been described as being selected out of substantially all methods in an execution list and a database list. Searching all methods in an execution list or a database list, or both, to locate the method with the highest compilation priority may prove to be expensive in the event that the execution list is extensive. Therefore, in one embodiment, a subset of the execution list may be searched, in lieu of substantially the entire execution list, to identify a highest priority method for compilation may. By way of example, the first "N" candidate methods from the execution list may be searched to identify the highest priority method in the first N candidate methods.

As previously mentioned, a compilation priorities of methods may be identified, at least in part, using the invocation counters. The invocation counters are generally counters which are incremented each time a method is accessed. It should be appreciated that in some embodiments, invocation counters may be decayed over time. For example, if a method was repeatedly invoked and slated for compilation at the beginning of program execution, but is never again invoked, the invocation counter may be decayed to reduce the compilation priority of the method. Once the invocation counter for a method has been decayed, e.g., exponentially decayed, compiling the method may no longer be advisable. As such, such methods may be periodically removed from the execution list.

Similarly, during the course of performing compilations, a determination is made regarding whether a method which is slated for compilation has previously been compiled. Alternatively, methods which have already been compiled may be removed as appropriate from either or both the execution list and the database list. In general, the overhead associated with checking the execution list and the database list for compiled methods may be relatively significant. However, compiled methods may be periodically removed, as for example at the beginning of an idle period, without departing from the spirit or the scope of the present invention.

Although an execution list has generally been described as being a list, or queue, of interpreted methods which are to be compiled, the execution list may also include compiled methods which are delayed from being re-compiled until there is an idle period. For example, in a system with two levels of compilers, once a method is compiled, if that method is repeatedly executed, it may prove to be desirable for the method to be re-compiled more efficiently. In such a system, the methods slated for re-compilations, or secondary compilations, may be included in the same execution list as interpreted methods which are slated for compilation. However, the methods slated for re-compilations may, on the other hand, be included in a separate execution list.

In one embodiment, the execution list may generally be a work list which includes delayed tasks, in addition to, or in lieu of, pending compilations. Such tasks may be prioritized. It should be appreciated that when a task from the work list is running, if an interrupt is received, the task may be allowed to be completed. By way of example, if the task involves garbage collection, suspending a garbage collection process and "backing out" of the garbage collection process may be as costly, if not more costly, than completing the process. As such, the garbage collection may be allowed to be completed. Tasks may also generally be suspended when an interrupt is received. Therefore, the present examples are to be considered as illustrative and not restrictive, and the invention is not to be limited to the details given herein, but may be modified within the scope of the appended claims along with their full scope of equivalents.

What is claimed is:

1. A method for dynamically performing tasks at runtime during the execution of an executable computer program, the method comprising:

determining whether there is a period which the level of activity associated with execution of the executable computer program is below a threshold level;

selecting a first task form a plurality of tasks which can be performed during the execution of the executable computer program when it is determined that there is a period which the level of activity associated with execution of the executable computer program is below a threshold level; and initializing performance of the first task during the first period after the selecting of the first task.

2. A method as recited in claim 1, wherein the method further comprises:

determining whether an interrupt is received by the executable computer program after the initialization of the performance of the first task; and continuing the performance of the first task for a predetermined period of time when it is determined that an interrupt has been received.

3. A method as recited in claim 2, wherein the method further comprises:

determining whether the performance of the first task is completed after the predetermined period of time; and aborting the performance of the first task when it is determined that the first task is not completed after the predetermined period of time.

4. A method as recited in claim 1, wherein the method further comprises:

determining whether the first task is a first method;

determining whether the first method is compiled when it is determined that the first task is the first method, wherein the determination of whether the first method is compiled is made during the period of low activity;

initializing a compilation of the first method during the period when it is determined that the first method is not compiled; and initializing a completion of the first task during the period when it is determined that the first task is not the first method.

5. A method as recited in claim 1, wherein the plurality of tasks is referenced in a first list associated with the executable computer program and the first task is a highest priority task for performance associated with the first list.

6. A method as recited in claim 1, wherein the executable computer program is compliant with the Java programming language.

7. A virtual machine for dynamically performing tasks at runtime during the execution of an executable computer program by the virtual machine, wherein the virtual machine is capable of:

determining whether there is a period which the level of activity associated with execution of the executable computer program is below a threshold level;

selecting a first task form a plurality of tasks which can be performed during the execution of the executable computer program when it is determined that there is a period which the level of activity associated with execution of the executable computer program is below a threshold level; and initializing performance of the first task during the first period after the selecting of the first task.

8. A virtual machine as recited in claim 7, wherein the plurality of tasks is referenced in a first list associated with the executable computer program and the first task is a highest priority task for performance associated with the first list.

9. A virtual machine as recited in claim 7, wherein a first set of tasks selected from the plurality of tasks is associated with a first list and a second set of tasks selected from the plurality of tasks is associated with a second list, the first list being created during the processing of the executable computer program the second list being created before the processing of the executable computer program, and wherein identifying the first task includes:
      selecting the first task as a highest priority task from the first list.

10. A virtual machine as recited in claim 7, wherein said virtual machine is further capable of:

determining whether an interrupt is received by the executable computer program after the initialization of the performance of the first task; and continuing the performance of the first task for a predetermined period of time when it is determined that an interrupt has been received.

11. A virtual machine as recited in claim 10, wherein said virtual machine is further capable of:

determining whether the performance of the first task is completed after the predetermined period of time; and aborting the performance of the first task when it is determined that the first task is not completed after the predetermined period of time.

12. A virtual machine as recited in claim 7, wherein said virtual machine is further capable of:

determining whether the first task is a first method;

determining whether the first method is compiled when it is determined that the first task is the first method, wherein the determination of whether the first method is compiled is made during the period of low activity;

initializing a compilation of the first method during the period when it is determined that the first method is not compiled; and initializing a completion of the first task during the period when it is determined that the first task is not the first method.

13. A virtual machine as recited in claim 7, wherein the first task is compilation of a first method.

14. A virtual machine as recited in claim 7, wherein the virtual machine is a Java complaint virtual machine.

15. A computer readable medium including computer program code for dynamically performing tasks at runtime during the execution of an executable computer program, wherein the readable medium comprises:

computer program code for determining whether there is a period which the level of activity associated with execution of the executable computer program is below a threshold level;

computer program code for selecting a first task form a plurality of tasks which can be performed during the execution of the executable computer program when it is determined that there is a period which the level of activity associated with execution of the executable computer program is below a threshold level; and computer program code for initializing performance of the first task during the first period after the selecting of the first task.

16. A computer readable medium as recited in claim 15, wherein the computer readable medium comprises:

computer program code for determining whether an interrupt is received by the executable computer program after the initialization of the performance of the first task; and computer program code for continuing the performance of the first task for a predetermined period of time when it is determined that an interrupt has been received.

17. A computer readable medium as recited in claim 15, wherein the computer readable medium comprises:

computer program code for determining whether an interrupt is received by the executable computer program after the initialization of the performance of the first task; and computer program code for continuing the performance of the first task for a predetermined period of time when it is determined that an interrupt has been received.

18. A computer readable medium as recited in claim 15, wherein the computer readable medium comprises:

computer program code for determining whether the performance of the first task is completed after the predetermined period of time; and computer program code for aborting the performance of the first task when it is determined that the first task is not completed after the predetermined period of time.

19. A computer readable medium as recited in claim 15, wherein the computer readable medium comprises:

computer program code for determining whether the first task is a first method;

computer program code for determining whether the first method is compiled when it is determined that the first task is the first method, wherein the determination of whether the first method is compiled is made during the period of low activity;

computer program code for initializing a compilation of the first method during the period when it is determined that the first method is not compiled; and computer program code for initializing a completion of the first task during the period when it is determined that the first task is not the first method.

20. A computer readable medium as recited in claim 15, wherein the executable computer program is compliant with the Java programming language.

* * * * *